United States Patent [19]

Carroll et al.

[11] Patent Number: 4,673,495
[45] Date of Patent: Jun. 16, 1987

[54] ENCLOSED CYCLONE SEPARATORS

[75] Inventors: Noel Carroll, Sherbrooke Road, Sherbrooke, Victoria; Collin J. Phelps, Fountain Gate, both of Australia

[73] Assignee: Noel Carroll, Sherbrooke, Australia

[21] Appl. No.: 719,517

[22] PCT Filed: Aug. 10, 1984

[86] PCT No.: PCT/AU84/00156

§ 371 Date: Mar. 28, 1985

§ 102(e) Date: Mar. 28, 1985

[87] PCT Pub. No.: WO85/00759

PCT Pub. Date: Feb. 28, 1985

[30] Foreign Application Priority Data

Aug. 11, 1983 [AU] Australia .............................. PG0780
May 8, 1984 [AU] Australia .............................. PG4888

[51] Int. Cl.[4] .............................................. B04C 5/00
[52] U.S. Cl. .................................. 210/232; 210/512.2; 55/345; 209/211
[58] Field of Search ........................... 209/144, 211; 210/512.1, 232, 512.2, 788; 55/343, 345, 346, 347

[56] References Cited

U.S. PATENT DOCUMENTS

| 2,670,056 | 2/1954 | Rossiter | 55/421 |
| 3,261,467 | 7/1966 | Wikdahl | 210/512.2 |
| 4,155,839 | 5/1979 | Seifert et al. | 209/211 |
| 4,211,643 | 7/1980 | Frykhult et al. | 209/211 |
| 4,237,006 | 12/1980 | Colman et al. | 210/512.1 |
| 4,278,534 | 7/1981 | Jakobson | 209/211 |

FOREIGN PATENT DOCUMENTS

| 410613 | 2/1971 | Australia . |
| 471421 | 4/1976 | Australia . |
| 109764 | 5/1984 | European Pat. Off. . |
| 905446 | 1/1954 | Fed. Rep. of Germany . |
| 2456558 | 1/1981 | France | 210/512.2 |
| WO83/03063 | 9/1983 | PCT Int'l Appl. . |
| 1072524 | 6/1967 | United Kingdom . |
| 1381239 | 1/1975 | United Kingdom . |
| 2136327 | 9/1984 | United Kingdom . |
| 426703 | 5/1974 | U.S.S.R. . |

Primary Examiner—Richard V. Fisher
Assistant Examiner—Wanda L. Millard

[57] ABSTRACT

A liquid separator apparatus comprising a plurality of cyclone separators having feed inlets, overflow outlet and underflow outlets. The cyclone separators are enclosed substantially within a partitioned housing such that an overflow outlet of a first cyclone separator comprises a first outlet for the housing, and an underflow outlet of a second cyclone separator comprises a second outlet for the housing. The feed inlet of the first cyclone separator being in fluid communication on one side of the partition with the housing inlet and the feed inlet of the second cyclone separator being in fluid communication with the underflow outlet of the first cyclone separator on the other side of the partition.

9 Claims, 4 Drawing Figures

ENCLOSED CYCLONE SEPARATORS

This invention relates to liquid separator apparatus.

Liquid separator apparatus utilizing a cyclone separator is known from, for example, U.S. Pat. No. 4,237,006 and International Application No. PCT/AU83/00028.

On the one hand, a difficulty exists with apparatus of the above described kind in that numerous interconnections are required to the cyclone separator, particularly but not exclusively where several cyclone separators are combined in a bank. Furthermore, in instances where the cyclone separator is subjected to wear such as because of the nature of the liquid mixture being separated or because of the flow conditions within the cyclone separator, relatively frequent replacement of the separator may be required. Normally, however, it is necessary to form the separator with a substantial wall thickness in order to make the separator strong enough to withstand the pressure forces thereon in operation and considerable cost may therefore be entailed in replacing the separator.

An object of the invention is to provide a liquid separator apparatus which permits, at least in part, some amelioration of one or both of the above mentioned problems.

In one aspect, the invention provides a liquid separator apparatus comprising a cyclone separator having an inlet and upstream and downstream outlets, said cyclone separator being positioned within a housing with the inlet of the cyclone separator open to the interior of the housing.

In a more specific form, the invention provides a liquid separator apparatus comprising a cyclone separator arranged for separating a liquid mixture into components thereof, and mounted within a substantially closed housing, said cyclone separator having at least one feed inlet, an overflow outlet and an underflow outlet and wherein said inlet to said cyclone separator is open to a chamber defined within the interior of said housing, said housing having an inlet for admission of said liquid mixture for flow through the chamber to said feed inlet of said cyclone separator, said outlets communicating with the exterior of the housing.

In another aspect, the invention provides a liquid separator apparatus comprising a plurality of cyclone separators arranged for separating a liquid mixture into two components thereof, and a substantially closed housing with said plurality of cyclone separators mounted within the interior thereof, each said cyclone separator having at least one feed inlet, an overflow outlet and an underflow outlet and wherein said inlet to at least one of said cyclone separators is open to a chamber defined by the interior of said housing, the housing being provided with inlet means for inflow of liquid to be separated into the said housing, the liquid separator apparatus being provided with first and second outlet means for outflow of the respective separated liquid components.

The invention is further described by way of example only with reference to the accompanying drawings in which.

Figure 1:
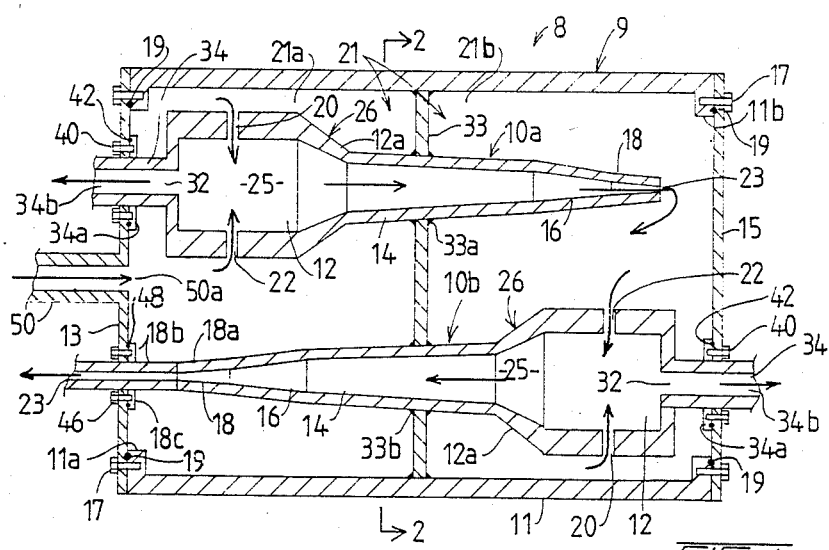
FIG. 1 is axial cross section of a liquid separator apparatus constructed in accordance with the invention.

The separator apparatus 8 shown in FIG. 1 includes a housing 9 which defines a pressure vessel. Housing 9 is of generally cylindrical configuration, of circular cross-section and including a hollow cylindrical pipe-like member 11 with inturned annular flanges 11a, 11b at each end. Circular end plates 13, 15 are provided, these being bolted to the flanges 11a, 11b respectively by bolts 17 passing through openings in the end plates and into threaded holes in the flanges 11a, 11b. The plates 13, 15 are sealed to the flanges 11a, 11b such as by the use of the interposed sealing rings 19 shown. There is thus defined within housing 9 a cylindrical chamber 21 which is closed at either end. Chamber 21 is divided into two axially spaced chamber portions 21a, 21b by an internal circular wall 33 which extends transversely across the chamber 21 and which is removably sealed about its periphery to the internal periphery of the member 11. Two cyclone separators 10a, 10b are fitted within the housing 9, these being in side by side relationship with their axes parallel and parallel to the lengthwise axis of the housing 9. The separators may be of form like that shown in U.S. Pat. No. 4,237,006 or like that shown in my International Application No. PCT/AU83/00028.

The separators 10a, 10b each have an outer casing 26 which defines an interior separating chamber 25 having first, second, third and fourth cylindrical portions 12, 14, 16 and 18 as shown. These portions are of progressively decreasing diameter and a portion 12a may be provided between portions 12 and 14, this being of tapered form. The portions 14, 16, 18 may be of tapered configuration also and, in the construction illustrated in FIG. 1 the portions 14 and 18 are so characterised. The separating chamber 25 is provided with tangential feed inlets 20, 22, these communicating with the portion 12 thereof. As shown, these inlets are in the form of openings extending through a relatively thickened wall portion of the casing 26 in the vicinity of the portion 12 whereby the inlets are of a length sufficient to ensure proper operation of the separators. An overflow outlet pipe 34 is provided extending axially from portion 12 of chamber 25 and this has at its inner end an opening 32 communicating with the portion 12 and, at its outer end, an overflow outlet 34b. Each separator has an underflow outlet 23. In the case of the separator 10a, the portion 18 of the separator is of frustoconical configuration ending in the outlet 23. In the case of the separator 10b, there is a section 18a of portion 18 which is of frustoconical configuration, this leading to a section 18b of cylindrical form which in turn leads to the overflow outlet 23 of that separator.

Separator 10a is positioned within housing 9 with the portion 12 of the separating chamber 25 at one end of the housing and with the overflow outlet pipe 34 extending through an opening in the plate 13 so as to be open to the exterior of the housing 9. Where the pipe 34 passes through the wall 13, the pipe 34 is sealed about its periphery to the opening in the wall through which the pipe passes, such as by providing the pipe 34 with an exterior flange 34a which is bolted by means of the bolts 40 shown passing through openings in the plate 13 and into threaded openings in the flange 34a. A suitable sealing element such as the annular sealing strip 42 shown may be provided between the flange 34 and the plate 13.

The separator 10a passes, in a direction away from plate 13 through an opening 33a in partition wall 33 and thence extends to a location adjacent plate 15. The inlets 20, 22 of the separator 10a are disposed within chamber portion 21a whilst the underflow outlet 23 is open to the chamber portion 21b. At the location where the separator 10a passes through the opening 33a, the periphery of the separator is sealed to the periphery of the opening 33a.

The separator 10b is arranged with its separating chamber portion 12 adjacent plate 15 and with its outlet pipe 34 passing through an opening in the plate 15 to the exterior of the housing 9. The pipe 34 of separator 10b is sealed about its exterior to the plate 15 where this passes through the plate opening. This may be effected by providing the outlet pipe 34 with a peripheral flange 34a which is bolted to the plate 15 by bolts 40 extending through openings in the plate and into threaded openings in the flange 34a, and by use of an annular sealing ring 42 between the flange and plate.

The separator 10b extends, in the direction away from plate 15, through an opening 33b in partition wall 33 and thence extends through an opening in the plate 13. The section 18b of the separator is that part which extends through the wall 13 and this section carries a peripheral flange 18c which is bolted to the plate 13 by bolts 46 which pass through openings in the plate 13 and into threaded openings in the flange 18c. A sealing ring 48 is positioned around the section 18b and between the plate 13 and flange 18c to seal the exterior of the separator 10b where this passes through the plate 13. The exterior of the separator is also sealed where this passes through the opening 33b.

The inlets 22, 20 of the separator 10b are open to the chamber portion 21b whilst the overflow outlet pipe 34 and the underflow outlet 23 are open to the exterior of the housing 9.

The separator apparatus 8 has an inlet means defining a pipe 50 which communicates with an inlet opening 50a in plate 13 whereby the pipe 50 provides communication with the portion 21a of chamber 21.

In use, liquid mixture to be separated is admitted via pipe 50 into chamber portion 21a and thence flows into the separating chamber 25 of the separator 10a via the inlets 20, 22. Within the separator 10a, the lighter components are separated from the heavier components and the lighter components emerge from the overflow outlet pipe 34 of the separator 10a and thus pass to the exterior of the housing 9. The heavier components travel lengthwise along the chamber 25 and emerge from the underflow outlet 23 of the separator 10a. These heavier components thus pass into the chamber portion 21b and thence into the separating chamber 25 of the separator 10b by inflow through the inlets 20, 22 of that separator. Again, lighter components of the liquid admitted to separator 10b pass out the overflow outlet pipe 34 of the separator 10b to the exterior of the housing 9, whilst the heavier components travel lengthwise along the separating chamber 25 to emerge from the underflow outlet 23 of separator 10b, at the exterior of the housing 9.

The described construction has the particular advantage that need to provide numerous exterior interconnections to the separators 10a, 10b, individually, is avoided since inflow into the inlets 20, 22 of each separator can occur directly from the chamber portions 21a and 21b. Furthermore, sealing of the entire assembly is simplified. Also, numerous apparatuses 8 may be readily assembled in interconnected fashion in a two or three dimensional array to increase separating capacity.

Figure 3:
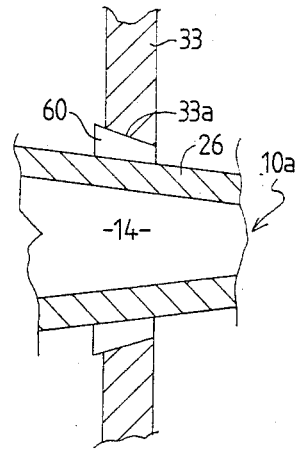
FIG. 3 is an enlarged axial cross section of part of one cyclone separator incorporated within the separator apparatus of FIG. 1, at the location where this passes through a partition wall in a housing of the separator apparatus.

Disassembly of the housing 9 for maintenance of the separators 10a, 10b can readily be effected by loosening and removing the bolts 17, 40 and/or 46. Since in practice there will not be a great pressure differential between the chamber portions 21a, 21b, great attention to sealing of the openings 33a, 33b through which the separators pass is not necessary. In practice, sealing may be effected simply by application of suitable sealing compounds which permit breaking of the seal on removal of the separators, and the wall 33 may be similarly sealed to the interior periphery of the member 11. FIG. 3 also shows however a construction for the opening 33a and which permits a largely automatic sealing action to be achieved when the separator 10a is inserted into the opening by movement in the direction towards the plate 15, that is to say from left to right as shown in FIG. 1. In this case, the partition wall 33 is positioned in a location where, in the assembled condition, the portion of the casing 26 of the separator 10a which defines the tapered portion 14 of the chamber 25 thereof passes through the opening 33a. The opening 33a is provided with a taper which is greater than the taper of the exterior of the casing 26 at the location of portion 14, and a resilient annular sealing ring 60 is positioned on the casing 26 at a location such that on insertion of the separator 10a through the opening 33a, the element is wedged between the exterior of the casing 26 and the periphery of the opening 33a. To facilitate this action, the element 60 may be of the wedge shaped transverse section shown.

The invention has been described merely by way of example and many modifications may be made. For example although the portions 21a, 21b of the chamber 21 are shown as being defined by a division of the chamber 21 by a single partition wall 33 it would be possible to replace the wall 33 by two walls, one positioned immediately to the left of the inlets 20, 22 of the separator 10b and one immediately to the right of the inlets 20, 22 of separator 10a as viewed in FIG. 1. In this construction, there would in effect be three chamber portions forming chamber 21 with the portions 21a, 21b to either axial end of the housing 9 and with a central chamber being therebetween. This construction has the advantage that the central chamber would not be subjected to liquid flow thereinto which would reduce the weight of the separator when in use because of the lesser quantity of liquid therewithin at any given time.

The described construction utilizes a cylindrical housing of circular transverse cross-section, but the housing could be of other cross-sectional form.

Although in the described separator apparatus there are two separators 10a, 10b, more separators may be included. It is preferred that approximately one half of the separators be arranged with outlet pipes 34 towards one end of the housing 9 and approximately one half arranged with their outlet pipes 34 at the other end, but this is not essential. All separators may for example have their outlet pipes at one end of the housing. Also, separators may be positioned at lengthwise spaced locations along the housing 9 rather than (or additional to) the employment of side by side positioning.

Figure 4:
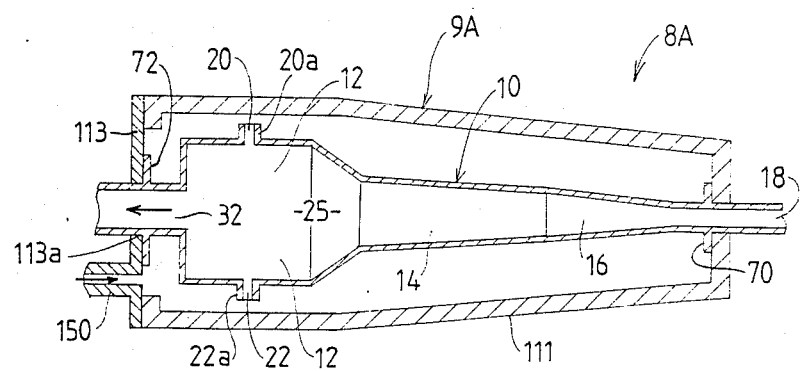
FIG. 4 is an axial cross section of another liquid separator apparatus constructed in accordance with the invention.

FIG. 4 shows a modified separator apparatus 8A useful with a single cyclone separator within a housing 9A. The cyclone separator is designated by reference numeral 10 and is of generally similar form to the separators 10a, 10b previously described. More particularly, the separator has a separating chamber 25 provided with tangential inlets 20, 22, these communicating with the separating chamber. In this instance, the separating chamber is formed from relatively thin sheet metal and the inlets 20, 22 are formed from sheet metal pipes 20a, 22a. Similarly, the overflow outlet pipe 34 is formed from sheet metal. The separating chamber 25 defines first, second, third and fourth cylindrical portions 12, 14, 16 and 18 as in the separators 10a, 10b. At the underflow outlet end, the separator 10 is provided with an outstanding annular flange 70 whilst the pipe 34 has a similar outstanding flange 72.

Figure 2:
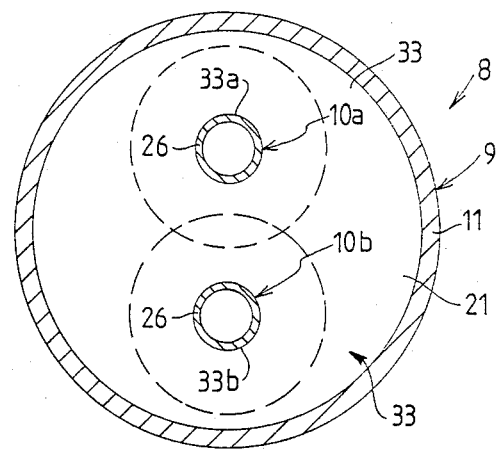
FIG. 2 is a cross section on the line 2—2 in FIG. 1.

The separator 10 is mounted in an elongate cylindrical housing 9A which defines a pressure vessel. Housing 9A has a cylindrical pipelike member 111 having an inturned flange 111a at one end, to which flange a circular end plate 113 is removably and sealingly secured. Plate 113 has an aperture 113a through which pipe 34 extends, with the flange 72 flush against the interior surface of the plate and sealingly secured thereto. At the opposite end of the pipelike member 111, there is provided a transverse end plate 115 which closes this end of the pipelike member. Plate 115 has an opening 115a therethrough and the portion 18 of the separating chamber 25 of the separator 10 passes through this opening with the flange 70 sealingly abutting, and secured to, the interior face of the plate 115. Plate 113 has an opening leading to an inlet pipe 150. In use, the arrangement of FIG. 4 functions in a similar manner to that shown in FIGS. 1 to 3. In particular, liquid to be separated is passed into the interior of the housing 9A via the pipe 150 from whence it enters the separating chamber 25 of the separator 10 via the pipes 20a, 22a, the denser component emerging from the separating chamber at portion 18 exteriorily of the housing 9A. The lighter component passes out the overflow outlet pipe 34a, also exteriorily of the separator.

The arrangement of FIG. 4 has the particular advantage that the housing 9A may be made of material of substantial thickness and resistance to wear such as by abrasion. The interior separator 10 may be made of relatively thin material but need not be formed as a pressure vessel since the pressure to either side of the wall of the cyclone separator 10 is substantially equalised in use. Where the separator 10 is likely to be subjected to considerable wear, such as where the liquid to be separated contains abrasive particles such as grit, the separator 10 can be formed in a relatively cheap fashion enabling it to be readily replaced in the event that excessive wear occurs.

Of course, it would be possible to form the separators 10a, 10b in the same form as the separator 10, or to form the separator 10 in the same form as either of the separators 10a or 10b.

These and many modification may be made thereto without departing from the spirit and scope of the invention as defined in the appended claims.

We claim:

1. A liquid separator apparatus comprising a plurality of cyclone separators arranged for separating a liquid mixture into two components thereof, and a substantially closed housing with said plurality of cyclone separators mounted within the interior thereof, each cyclone separator having means defining a feed inlet means defining, an overflow outlet for discharge of the less dense of said liquid components and means defining an underflow outlet for the denser of said liquid mixture components, said feed inlet to at least one of said cyclone separators being open to a partitioned chamber defined by the interior of said housing, the housing being provided with housing inlet means for inflow of liquid to be separated into said housing, the liquid separator apparatus being provided with first outlet means comprising the overflow outlets of the cyclone separators communicating with the exterior of said housing, and second outlet means comprising the underflow outlet of one separator communicating with the exterior of the housing, wherein said chamber is partitioned to form first and second lengthwise spaced substantially closed portions, the first said separator having said feed inlet thereof open to the first portion of the chamber, to which first portion said housing inlet means communicates, and a second separator having said feed inlet thereof open to the second portion of said chamber, said first separator having its underflow outlet communicating with said second portion of the separating chamber so that outflow from the underflow outlet is in use directed through the second portion of the chamber to the feed inlet of the second separator.

2. A liquid separator apparatus as claimed in claim 1, wherein the cyclone separator is arranged to be substantially entirely subjected to pressure of said liquid mixture when admitted to said housing.

3. A liquid separator apparatus as claimed in claim 2 wherein said housing is constructed as a pressure vessel and said cyclone separator is thin walled.

4. A liquid separator apparatus as claimed in claim 1 wherein said cyclone separator is demountably removable from said housing.

5. A liquid separator apparatus as claimed in claim 1 wherein said housing is cylindrical with opposed closed ends.

6. A liquid separator apparatus as claimed in claim 1, wherein said first and second outlet means are open to the exterior of said housing at the opposed ends of the housing.

7. A liquid separator apparatus as claimed in claim 1 wherein said housing is generally cylindrical, and the cyclone separators extend axially in side by side relationship in the lengthwise direction of the housing.

8. A liquid separator apparatus as claimed in claim 1 wherein said partitioned chamber is formed by one or more extending transversely of the housing and through which the cyclone separators pass.

9. A liquid separator apparatus as claimed in claim 1 wherein the partitioned chamber is defined by at least one partition wall extending transversely of the housing and through which the cyclone separators sealingly pass, the housing having removable end walls through which the overflow outlet of said first separator and the overflow and underflow outlets of the second separator pass, said separators being demountable from said housing by removal of the end walls and axial sliding through the partition wall.

* * * * *